INVENTOR
BOBBY R. MORRIS
ATTORNEY

Jan. 31, 1967 B. R. MORRIS 3,301,105
METHOD AND APPARATUS FOR SHAPING THE EDGE ON A CONTACT LENS
Filed Feb. 23, 1965 6 Sheets-Sheet 2

INVENTOR
BOBBY R. MORRIS
BY Patrick J. Henry
ATTORNEY

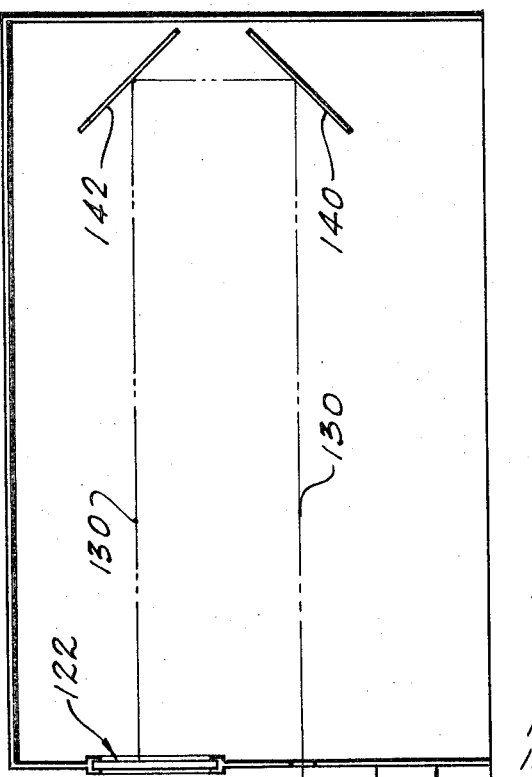
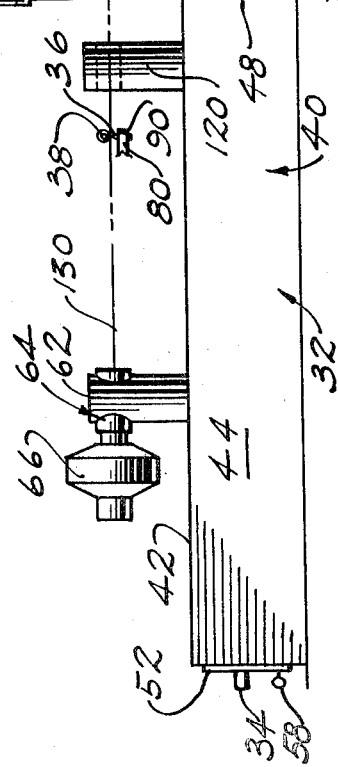

INVENTOR
BOBBY R. MORRIS
BY Patrick & Lacey
ATTORNEY

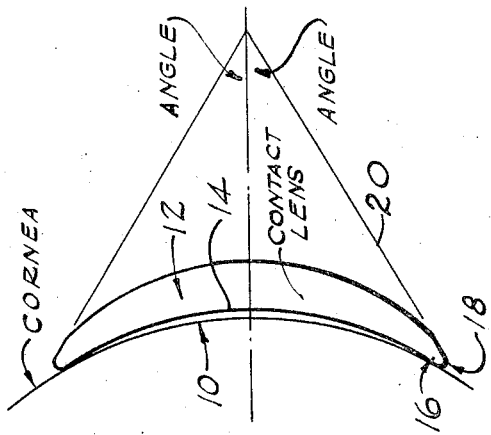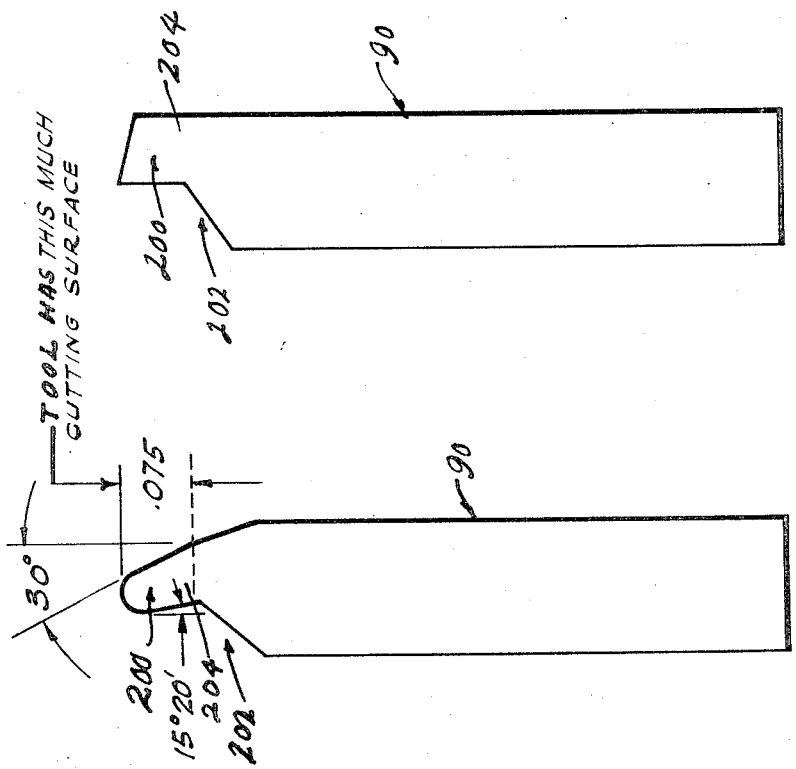

FIG. 11

BASE - CURVE

| | 4800 | 4750 | 4700 | 4650 | 4600 | 4550 | 4500 | 4450 | 4400 | 4350 | 4300 | 4250 | 4200 | 4150 | 4100 | 4050 | 4000 |
|---|---|---|---|---|---|---|---|---|---|---|---|---|---|---|---|---|---|
| 10.4 | 69 | 70 | 71 | 72 | 73 | 74 | 75 | 76 | 77 | 78 | 79 | 80 | 81 | 82 | 83 | 84 | 85 |
| 10.2 | 71 | 72 | 73 | 74 | 75 | 76 | 77 | 78 | 79 | 80 | 81 | 82 | 83 | 84 | 85 | 86 | 87 |
| 10.0 | 73 | 74 | 75 | 76 | 77 | 78 | 79 | 80 | 81 | 82 | 83 | 84 | 85 | 86 | 87 | 88 | 89 |
| 9.8 | 75 | 76 | 77 | 78 | 79 | 80 | 81 | 82 | 83 | 84 | 85 | 86 | 87 | 88 | 89 | 90 | 91 |
| 9.6 | 77 | 78 | 79 | 80 | 81 | 82 | 83 | 84 | 85 | 86 | 87 | 88 | 89 | 90 | 91 | 92 | 93 |
| 9.4 | 79 | 80 | 81 | 82 | 83 | 84 | 85 | 86 | 87 | 88 | 89 | 90 | 91 | 92 | 93 | 94 | 95 |
| 9.2 | 81 | 82 | 83 | 84 | 85 | 86 | 87 | 88 | 89 | 90 | 91 | 92 | 93 | 94 | 95 | 96 | 97 |
| 9.0 | 83 | 84 | 85 | 86 | 87 | 88 | 89 | 90 | 91 | 92 | 93 | 94 | 95 | 96 | 97 | 98 | 99 |
| 8.8 | 85 | 86 | 87 | 88 | 89 | 90 | 91 | 92 | 93 | 94 | 95 | 96 | 97 | 98 | 99 | 100 | 101 |
| 8.6 | 87 | 88 | 89 | 90 | 91 | 92 | 93 | 94 | 95 | 96 | 97 | 98 | 99 | 100 | 101 | 102 | 103 |
| 8.4 | 89 | 90 | 91 | 92 | 93 | 94 | 95 | 96 | 97 | 98 | 99 | 100 | 101 | 102 | 103 | 104 | 105 |
| 8.2 | 91 | 92 | 93 | 94 | 95 | 96 | 97 | 98 | 99 | 100 | 101 | 102 | 103 | 104 | 105 | 106 | 107 |
| 8.0 | 93 | 94 | 95 | 96 | 97 | 98 | 99 | 100 | 101 | 102 | 103 | 104 | 105 | 106 | 107 | 108 | 109 |
| 7.8 | 95 | 96 | 97 | 98 | 99 | 100 | 101 | 102 | 103 | 104 | 105 | 106 | 107 | 108 | 109 | 110 | 111 |
| 7.6 | 97 | 98 | 99 | 100 | 101 | 102 | 103 | 104 | 105 | 106 | 107 | 108 | 109 | 110 | 111 | 112 | 113 |
| 7.4 | 99 | 100 | 101 | 102 | 103 | 104 | 105 | 106 | 107 | 108 | 109 | 110 | 111 | 112 | 113 | 114 | 115 |
| 7.2 | 101 | 102 | 103 | 104 | 105 | 106 | 107 | 108 | 109 | 110 | 111 | 112 | 113 | 114 | 115 | 116 | 117 |
| 7.0 | 103 | 104 | 105 | 106 | 107 | 108 | 109 | 110 | 111 | 112 | 113 | 114 | 115 | 116 | 117 | 118 | 119 |
| 6.8 | 105 | 106 | 107 | 108 | 109 | 110 | 111 | 112 | 113 | 114 | 115 | 116 | 117 | 118 | 119 | 120 | 121 |
| 6.6 | 107 | 108 | 109 | 110 | 111 | 112 | 113 | 114 | 115 | 116 | 117 | 118 | 119 | 120 | 121 | 122 | 123 |
| 6.4 | 109 | 110 | 111 | 112 | 113 | 114 | 115 | 116 | 117 | 118 | 119 | 120 | 121 | 122 | 123 | 124 | 125 |
| 6.2 | 111 | 112 | 113 | 114 | 115 | 116 | 117 | 118 | 119 | 120 | 121 | 122 | 123 | 124 | 125 | 126 | 127 |
| 6.0 | 113 | 114 | 115 | 116 | 117 | 118 | 119 | 120 | 121 | 122 | 123 | 124 | 125 | 126 | 127 | 128 | 129 |

DIAMETER

TEMP #7 = 75°
TEMP #5 = 80°
TEMP #3 = 85°
TEMP #1 = 90°
TEMP #4 = 95°
TEMP #2 = 100
TEMP #6 = 105
TEMP #8 = 110
TEMP #9 = 115

NOTE:
1. ADD 2° FOR EACH DIO STEEPER THAN K.
2. ADD 2° FOR EACH DIO OF ASTIGMATISM.

INVENTOR
BOBBY R. MORRIS
BY Patrick J. Henry
ATTORNEY 3,301,105
METHOD AND APPARATUS FOR SHAPING
THE EDGE ON A CONTACT LENS
Bobby R. Morris, Decatur, Ga., assignor to Quality Optics,
Incorporated, Atlanta, Ga.
Filed Feb. 23, 1965, Ser. No. 434,271
19 Claims. (Cl. 82—14)

This invention relates to a method and apparatus for shaping the edge on a contact lens and particularly to a method for holding a contact lens in proper alignment, enlarging an image of a shaping means and the contact lens edge, and then a procedure including guide means for properly shaping the edge. There is also disclosed an embodiment of an apparatus for correctly aligning and retaining the contact lens while it is being shaped and an apparatus for projecting an image by means of light reflection and also with the apparatus a guide template means pre-arranged to be followed to provide the correct edge characteristics.

Plastic contact lens of the sort which are sometimes called a corneal lens, in addition to the correct optical prescription ground or shaped into the lens require a curvature to fit comfortably on the curvature of the eye ball and an important part of the lens is in the shaping of the edge to obtain the correct characteristic of shape as to angle an inclination and so forth. There is some difficulty in applying the proper shape to the edge of a contact lens because the lens is very small and transparent and difficult to see and because the tolerances are very small and the material is easily removed.

A primary object of this invention is to provide a method for properly applying the edge to a contact lens through the use of a procedure for holding the lens in proper alignment, projecting same in magnification so that it can be readily seen, and applying an edge forming means through the use of a guide arrangement which assures proper shaping.

Still another object of this invention resides in the method alone for projecting a magnified image of the edge of a contact lens so that it can be viewed.

An additional object of this invention is found in the means and method for aligning and holding a contact lens in proper axial relationship so that it can be viewed or projected.

Another object of this invention resides in the method for shaping an edge through the use of a selected guide means which may be in one form a template of metal or the like and a control member which follows the template to properly apply the pre-determined edge.

Another object of this invention resides in the particular mechanical apparatus employed to position the contact lens in a fixture or chuck-like member in proper axial relationship and to hold it in this relationship during the shaping of the edge.

Another object of this invention resides in the apparatus for projecting an image of the edge of the contact lens onto a viewing screen in enlarged relationship so that it may be viewed while operations are being performed.

Another object of this invention resides in the combination in the apparatus between a means for holding the contact lens in proper alignment, a means for effecting a shaping operation on the edge including a tool for for removing the material on the edge, a control member for controlling the tool, and a pre-determined template means for controlling the path of the control member, together with some means for enlarging the tool and the edge of the contact lens onto a viewing screen, whereby the operator can see the action taking place in the removal of the edge of the contact lens. This system enables the laboratory (the place that manufactures the lens) to duplicate each edge substantially the same as to the vertical edge angle and the thickness for each individual lens.

Generally described, the method of the present invention comprises properly placing the lens to be treated on a holder in proper alignment, rotating the lens so as to substantially rotate the edge of the lens in a fixed vertical plane, selectively bringing a cutting tool, such as a diamond, into position against the edge while it rotates and moving said tool in a pre-determined path to round the edge and apply the proper angle to the lens, while simultaneously with the operation projecting an enlarged image of the two angle ends onto a viewing screen where the operator observes the cutting of the lens during the operation.

The mechanism of the present invention in one embodiment contemplates a base which is normally stationary on a work table or the like, a chuck or jig or other similar holder mechanism having aligned laterally and axially projecting contact lens holders which are retractable to insert and remove the lens therefrom, a cutting tool holder spaced from the lens and having a removable cutting tool retaining means thereon, means mounting the cutting tool for rotatable and vertical movement simultaneously or independently and selectively, a control member connected to said means for moving said cutting tool to effectuate selected control thereof, and a guide means which may be in the form of a pre-determined metal template having the proper curvature and angle thereon controlling the movement of the control member to control the action of the cutting tool against the lens as it is rotated, a high intensity light on one side of the lens, a condenser for condensing the light, a projecting means on said base, and a viewing screen onto which said enlarged image of the lens and tool is projected. There are various other details and mechanisms which will be described more fully in the specification. A device is used, which is not a permanent part of the previously described mechanism, for properly aligning the contact lens itself on a holder that is insertable on the chuck or similar mechanism on the machine. This aligning device consists of a cylindrical tube with a bore having a tubular member on which the contact lens is positioned and inserted through the bore to rest in proper axial alignment and then a removable rod receives a temporary wax or other material for holding the contact lens in place while it is removed and repositioned on the machine.

Other and further objects and advantages of my invention will become apparent upon reading the following specification taken in conjunction with the accompanying drawings, in which:

FIG. 3 is a side elevation view of a portion of the machine illustrating diagrammatically the optical image projecting arrangement.

FIG. 6 is an assembly view of the separate holder used to align and place the contact lens before insertion on the machine shown in FIG. 1.

FIG. 7 is a side view of the diamond cutting tool which may be used with the present invention.

FIG. 8 is a side elevation view of the other side of the tool shown in FIG. 7.

FIG. 9 is a diagrammatic view of a cornea showing a typical lens fitted thereto and illustrating the critical angles and curvature which may be manufactured by the present device.

FIG. 11 is a table of typical contact lens angles as applied to a base-curve and the diameter of the lens.

Figure 1:
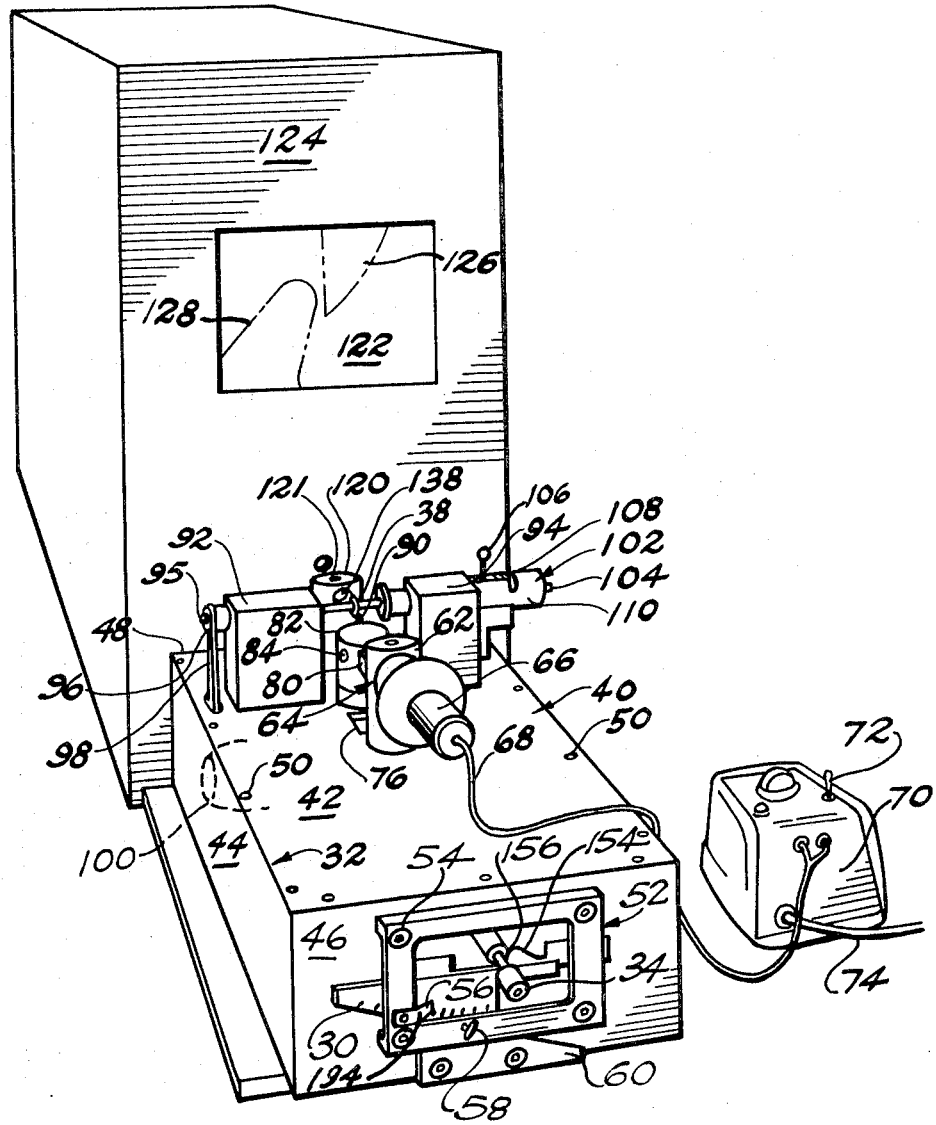
FIG. 1 is a perspective view of the front of the machine for performing the present method.
Figure 2:
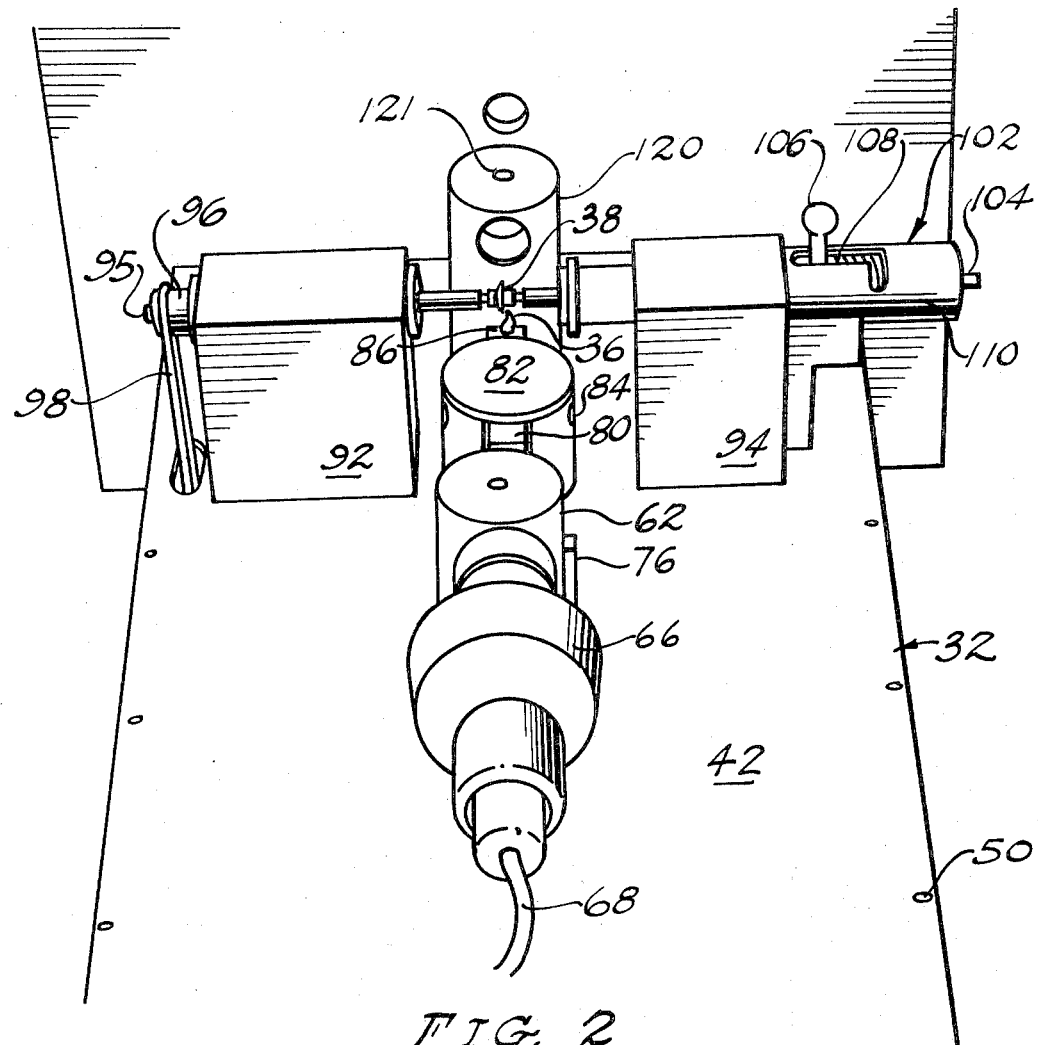
FIG. 2 is an enlarged perspective view of part of the machine looking down on the front thereof.
Figure 10:
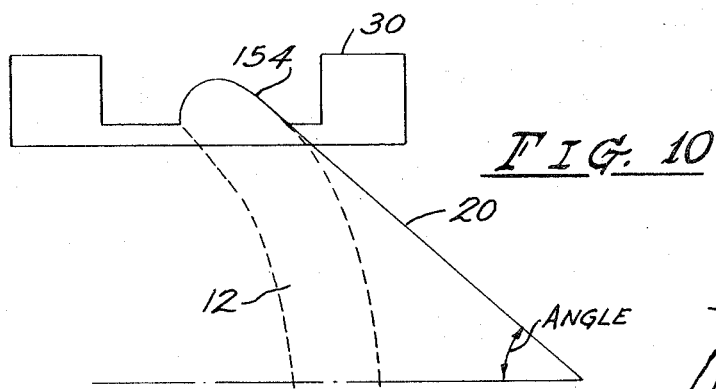
FIG. 10 is a diagram view of the template and curve angle involved in cutting the edge of a contact lens according to the present invention.
Figure 4:
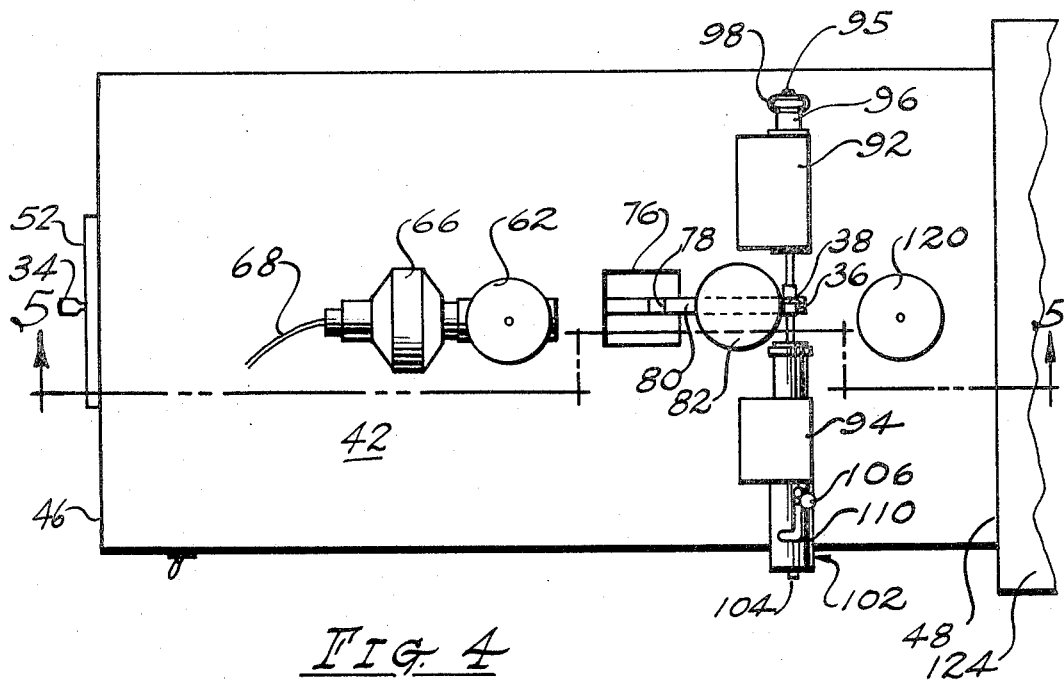
FIG. 4 is a top plan view of the machine shown in FIG. 1 with a portion of one end removed.

Referring to the diagrammatic view of a typical contact lens shown in FIG. 9, it is to be noted that the surface of the cornea 10 is covered by the small plastic corneal lens 12 which has a curvature along the back side 14 to fit the cornea 10 and to adhere thereto through well known characteristics in the contact lens art. Normally, the internal curvature along 14 is not exactly the same as the curvature of the cornea for the entire extent of the lens because it is adjusted slightly near the edges of the lens to prevent too close a fit which would result in irritation and discomfort. The edge of the lens is a portion designated generally at 16 and involves the curved portion of the edge at 18 as well as the critical angle represented by the line 20 which is tangential to the angle of the lens. The present invention is directed to the finishing of the lens 10 by providing a correct angle represented along the tangential line 20 and the proper edge curvature noted at 18.

Well known methods of examination of eyes for the purpose of fitting corneal contact lens using common and well known machines result in a prescription for the lens as well as certain basic information such as the curvature of the cornea, which is a basic reading obtained from such a machine as an ophthalometer or a keratometer. This information is tabulated in terms of basic units and the diameter is represented by typical units such as 6.0 through 10.6 and a unit of measurement commonly known as a diopter. In the art there are at least three types of edges: (1) the rolled edge, (2) the tapered edge, (3) the standard tapered edge. Some contact lens fitters and practitioners feel that the condition of the edge determines perhaps 50% of the success of a fitting. The correct characteristics including the correct apex angle would be one that allows the eyelid to move in its most natural state with a minimum of bumping. Thus the correct thickness would be thin enough to produce a minimum lid bump but avoiding a knife edge, and maintaining a continuity with the body of the lens. The perfect contour would be provided for by the base curve and the correct apex angle. In order to arrive at the most desirable apex angle, one needs to know the optimum position of the apex with respect to the unfinished edge, and also the angle from the apex to the anterior surface curve. The apex can be positioned at any point on the square end of an unfinished lens. Trial and error on many cases indicates perhaps the optimum position to be approximately one third of the way from the bottom edge to the top edge. This will put the apex finally just above the edge of the peripheral bevel. In order to determine the proper apex angle, a tangent to the cornea at the point where the lid leaves the cornea to traverse the lens is estimated to be an optimum angle which would allow the lid to move over the lens without interference and consequently without sensation. This tangent was constructed for every dioptic curve from 40.00 diopters to 47.00 diopters and an unfinished lens edge superimposed at the point of tangent. This angle on the outside edge of the lens beginning at the previously determined apex intercepts the outside surface at a point too far into the center of the lens where it interferes with the optics. The usual bevel angles used previously provide strikingly different edges. Consequently it was necessary to choose an angle that most closely approximates the tangent while allowing a practical optical solution. This angle turns out to be 15 degrees steeper than the tangent.

In special situations, such as fitting steeper and fitting with the rule astigmatism, it is necessary to adjust the procedure. These cases will require a different apex angle to accommodate for a different lid approach. This system puts the emphasis on the base curve and the diameter.

Using the above system, templates were constructed for the different apex angles and all with the same contour and thickness. The angle is selected from the attached chart, FIG. 11. When inserted in the edger with the proper template 154, the proper edge is put on the lens and it is the same for every lens of the same base curve and diameter.

While the edge is being cut with the diamond tool 90, a shadowgraph of the operation, enlarged 50 times, is visible to the operator. This aids in aligning the lens and in comparing the edge before and after. While still mounted, the lens 38 edge is polished with a cotton swab and silver polish.

In summation, the template assembly 30, template 154 selection is as follows:

(1) Having previously obtained diameter and diopter readings, find the diameter on the vertical and intersect with the diopter on the horizontal to obtain apex angle.

(2) At the bottom of the chart, select the proper template number which has the nearest degree reading to apex angle found above. Several preconstructed templates are available and designated generally by reference numeral 30 and will be described in more detail hereinafter. It is noted that the template number which has the nearest degree reading to the apex angle of 91 degrees is template number one which is 90 degrees.

(3) Placing the template into the front of the present machine which is designated generally and overall in assembly by reference numeral 32, the lens having been properly mounted on the machine as will be described hereinafter, the machine is operated and controlled by moving a control 34 across the pre-determined template which causes the cutting tool 36 to move into engagement with a contact lens 38 rotating on the machine thereby placing the proper angle and curvature on the lens.

Referring now to the apparatus in FIG. 1 designated generally by reference numeral 32, and thence to the other figures in the drawing as the description of the apparatus unfolds, a strong metal base 40 is constructed from durable aluminum plate creating a top 42 sides 44 front 46 and rear 48 connected together by means of screws 50. The inside of the base 40 is hollow and through this passes a control member 34 as will be described hereinafter.

The front of the base is provided with a rectangular bevel frame 52 held in place by screws 54 and having a space formed between it and the front 46 of the base 40 into which may be positioned a template assembly 30, previously mentioned, and which is held in place by a mounting means, there being an indicator 56 for diameter control, a set screw 58 and a slotted guide member 60 bolted to the bottom and inside of the frame 52. With this arrangement templates 30, selected according to the method and the chart described herein, may be easily inserted and removed as desired depending upon the particular edge to be applied to a particular contact lens 38.

Mounted on the top 42 of the base 40, in proper alignment, on a cylindrical holder 62 having an opening and clamping means 64 therein, is high intensity light 66 of conventional construction providing a high intensity light beam from the end thereof and being connected by an electric wire 68 to a control box 70 having a switch 72 thereon and having a power supply line 74. In front of the holder 62 there is an opening 76 cut from the top 42 through which projects a vertical control member 78 carrying a horizontal control member 80 which is pivotly mounted on a holder 82 by means of pivot 84. Member 80 has an opening 86 therein in which is mounted the diamond tool shown in FIGS. 7 and 8 to be described later, and which is identified generally and overall by reference numeral 90.

A pair of spaced, heavy steel support blocks 92, 94 mounted on top 42 of base 40 have openings therethrough supporting a horizontal drive shaft 95 on block 92 which has a pulley 96 thereon driven by a belt 98 from an electric motor 100 inside of base 40. Motor 100 is driven by 115 A.C. supplied through the control 70. Block 94 supports the retractable portion of a chuck 102 having a retractable shaft 104 therein to which is connected a handle 106 operating against a coil spring 108 inside of the sleeve 110 to retract the shaft 104 and separate same from shaft 95. The contact lens 38 is mounted in an aligned manner, to be described hereinafter, in the chuck 102 to be acted upon by the cutting tool 90. At the rear of the base 40, on the other side of the contact lens 38 from the high intensity light 66, there is a cylindrical metal holder 120 having a retaining means 121 therein which retains a projection lens f 3.5 (focal length 2 inches) which projects the beam of light reflected from the contact lens 38 edge thereof and the diamond cutting tool 90 to project an enlarged image on the screen 122 shown on the front of light and reflection box 124. The image of the lens is identified as 126 and the cutting tool is 128.

Referring to FIG. 3, it is seen that the beam of light represented by the line 130 from the high intensity light 66 across the image of the lens 38 and the diamond cutting tool 90 condensed through the condenser lens 138 strikes a reflective mirror 140 which projects the image vertically to a second reflecting mirror 142 which projects the image back in the direction it came from along the image line 130 to the image screen 122 which is an opaque glass screen arrangement comprising a pair of glass members giving a considerably enlarged image of just the contact lens edge enlarged as number 126 and the cutting tool edge enlarged as number 128. The magnification could be something in the order of fifty times thereby enabling the operator to see clearly the cutting action which is actually controlled by the template 30.

Figure 5:
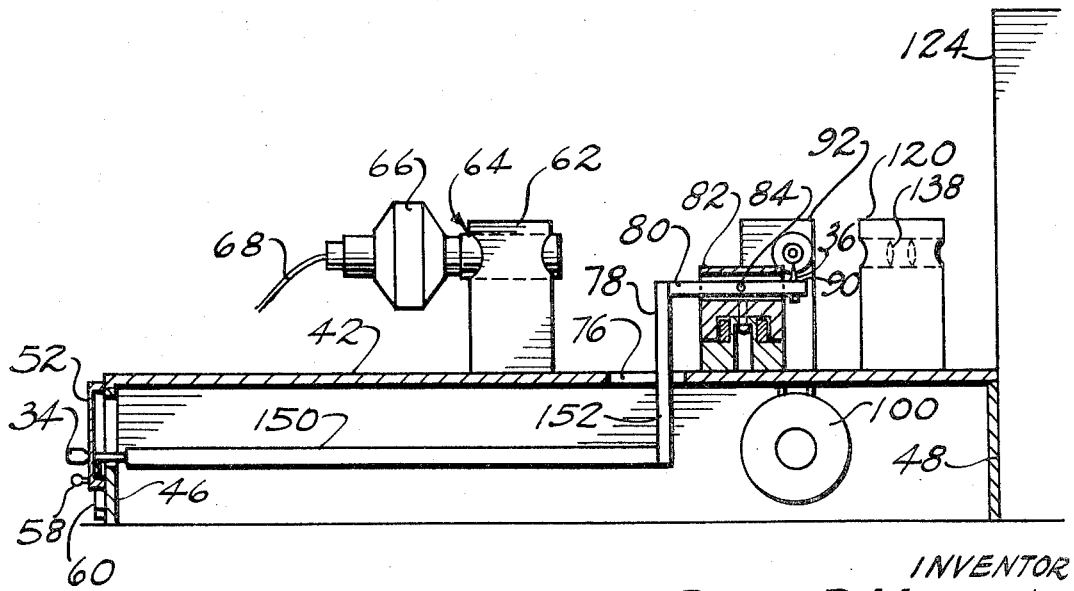
FIG. 5 is a cross-sectional view of the machine shown in FIG. 1 taken substantially along lines 5—5 in FIG. 5 and with a portion of one end of the machine removed.

Referring to FIG. 5, it is seen that the control member 34 is connected to an elongated control link member 150 which is in turn rigidly connected to a vertical member 78 that is rigidly connected to a horizontal member 80 mentioned previously. Thus, the cutting tool 90 is constrained to cut and move only as determined by the path of the movement of control link 150 which is controlled by movement of the control 34 across the surface of the template 30. The critical angle on the template is represented by the slope designated as 154 and the critical edge is along the curved portion 156 thereof. Proper alignment of the contact lens 38 in the chuck 102, the diamond tool 90 in position, and use of the proper template 30 assures a proper edge on the contact lens with reduced error and variation from one lens to another depending upon the operator.

*Proper alignment of lens*

In order to assure proper alignment of the contact lens when placed in the chuck 102 between the shafts 95 and 104, a holder shown in FIG. 6 identified generally by reference numeral 164, comprises a metal cylindrical body 166 having a bore 168 therein and a concentrically enlarged chamber 170 into which is fitted the cylindrical protrusion 172 on a base 174 which has three radially formed notches 176 therein approximately 120 degrees apart. The notches extend from the outer periphery toward the center and terminates before intersecting a small bore 188 therein. A cylindrical lens retaining member 182 has three fingers 184 on the bottom thereof complementary with the radially spaced openings 176 and the member 182 may be inserted through the bore 168 to place the fingers 184 in the radial grooves 176 thereby assuring the proper centering of member 182. An elongated smaller, cylindrical pin 186 fits through the bore 188 in member 182 and is removable therefrom. A tapered holder or black 190, constructed from brass or the like has the tapered pin portion 192 complementary to a recess or hole 194 in pin 186 to be removably positioned therein. Block 190 has an enlarged portion 196 with a small wax cavity 198. To center a lens, the lens 38 shown diagrammatically in FIG. 6, is placed on base 174 with the convex portion up and the retaining member 182 is assembled gently until it has caused the lens 38 to align itself axially with the space defined inside of fingers 184. A small piece of sticking wax, such as Nissl, is applied to the cavity 198 of the member 190 and member 186 is inserted through the bore 188 and block 190 pin 192 inserted in recess 194. After the wax cools in approximately 30 to 60 seconds, the centering member 182 with the pin 186 in place is removed from the block 164 and while still holding the centering slide, the lens 38 is freed with the pin 186 from the holder 182 using a prying tool if necessary. Block 190, with the lens in place is removed. Block 190 is placed in the chuck 102 with shaft 104 contacting one side of the lens 38.

The indicator or diameter control 56 is a fine spring platelike member which has been etched or marked with a series of graduations so that by sliding this diameter plate to match up with the pointer 194, the diameter may be adjusted in this manner after which the hand screw or set screw 50 is tightened.

The operation of the edging method and apparatus may be summarized as follows:

(1) Having selected the template 30 and template plate 152, the diameter figure desired is selected by setting the diameter plate in the proper position and tightening the hand screw.

(2) Then the light 66 and motor 100 is turned on at the control box 70, and the operator observes the lens image on the screen 122, the lens 38 already having been centered, removed and placed on the chuck 102 as previously described. The operator observes the image (which is magnified some 50 times) watching the edge 126 to determine by sight if there is any motion to the right or left which would indicate the extent, if any, of wobble. If the lens is not properly aligned and centered, and significant wobble is apparent, then the operator removes and re-centers and re-positions the lens and repeats the check just mentioned until the lens rotates in substantially a fixed-edge pattern.

(3) The template 30 is slid to the left and the operating lever control member 34 is moved to the right until they visibly come into contact on the screen 122, making sure by observation of the screen 122 that the cuting tool 90 does not touch the lens 38.

(4) Simultaneously moving both the template 30 and the operating lever control member 34 towards the lens 38, the tool 90 is stopped when it is nearly in contact with the lens edge.

(5) Then moving the operating lever control member 34 slowly up and over the contour of the template 152 and down the other side as far as it will go, and then back over the template to the starting point, the proper cut has been made.

(6) After cutting the lens 38, the operating lever control member 34 is moved all the way back to the left so that the diamond in tool 90 will be out of the way when removing the lens 38.

(7) The edge of the lens 38 is now ready for polishing which may be done with a saturated cotton swab having "Silvo" or similar material and the swab is applied to the edge of lens 38 as the lens 38 spins for approximately thirty seconds at times making a slight side-to-side motion.

(8) Finally, the lens 38 is removed and properly cleaned for application of any suitable eye solution and use.

(9) It is to be noted the radius of a typical edge might be in the neighborhood of .003 whereby the radius of a diamond on the tool 90 would be in the area of .030.

The diamond tool 90 shown in FIGS. 7 and 8 is only one typical tool which may be used with the present invention. It includes an industrial diamond 200 which is purchased on the open market and which is normally purchased in place on the tool 90 being affixed by methods which per se do not form a part of this invention. Further control under the method of the present invention can be obtained by selecting the angle of diamond tool and as mentioned previously the radius of the diamond could be in an order of .030. The tool 90 is provided with an offset portion at the top 202 on which is a protruding finger 204 holding the diamond. The shaft of the tool is made from tool steel or other suitable material.

While I have shown and described a particular embodiment of my invention together with suggested mode of operation and while I have described a particular method practiced in accordance with the present invention, this is by way of illustration only and does not constitute the only apparatus or the only method disclosed by my invention since various alterations, changes, deviations, eliminations, variations, ramifications, elucidations and revisions may be made in the embodiments of the method and apparatus shown without departing from the scope of my invention as defined in the appended claims.

I claim:
1. In a method for providing an edge on a contact lens, the steps comprising:
   (a) mounting the lens for correct axial alignment and rotating the lens in a substantially correct and constant plane as to the circular edge thereof,
   (b) while rotating the lens, bringing a cutting tool into engagement with the edge of the lens, and
   (c) controlling the movement of the cutting tool by guiding same in a pre-determined path as it moves into contact with and around the edge of the lens and at an angle, thereby placing the desired angle and edge contour on the lens.
2. The method claimed in claim 1 wherein a magnified, two-dimensional elevation view of the edge of the lens and cutting tool is projected on a screen in front of an operator who controls the movement of the cutting tool.
3. The method claimed in claim 2 wherein said lens is first axially aligned on a holder with a detachable substance such as wax and then the lens and the holder are rotated as stated in "a."
4. The method in claim 1 wherein the angle applied to the lens by the cutting tool is controlled by guiding the tool by a pre-determined fixed guide surface which is followed by the operator as the tool is controlled.
5. The method in claim 4 wherein the pre-determined guide surface is selected factors according to computation based upon measurement of the eye for which the lens is made.
6. In a method for providing an edge on a contact lens, the steps comprising:
   (a) mounting the lens for correct axial alignment and rotating the lens in a substantially correct and constant plane as to the circular edge thereof,
   (b) while rotating the lens, bringing a cutting tool into engagement with the edge of the lens,
   (c) controlling the movement of the cutting tool by guiding same in a pre-determined path as it moves into contact with the edge of the lens thereby placing the desired angle and contour on the lens, while
   (d) projecting a magnified image of the rotating edge of the lens and the edge of the cutting tool on a screen in front of an operator who controls the movement of the cutting tool.
7. The method claimed in claim 6 wherein said lens is first axially aligned on a holder and then the lens is attached to the holder by means of a removable substance such as wax or the like.
8. The method in claim 6 wherein the tool is moved into engagement with the lens edge as the edge rotates and the tool is controlled by a fixed, pre-determined guide means which guides the operator's movement.
9. The method in claim 8 wherein the tool and the lens is projected and magnified in elevation on a screen in front of the operator.
10. In an apparatus for removing the material to form the edge of a contact lens which lens is constructed in a particular manner having a concave and convex surface with the proper optical prescription and which is manufactured from a substance such as plastic and the like,
    (a) a base,
    (b) a lens retaining means on said base maintaining said lens in axial alignment,
    (c) a cutting tool on said base,
    (d) means on said base for moving said retained lens and said cutting tool relative to each other with the edge of the lens substantially in a constant plane,
    (e) a control means for said cutting tool including a means that is manually movable on said base,
    (f) and a guide means on said base for guiding the movement of the control means "e" into the edge of the contact lens.
11. The device in claim 10 including means for varying said control means on said base whereby different movements may be used representing the desired characteristics of the edge to be placed on the lens.
12. The device claimed in claim 11, wherein there is a screen and projection means on said base for projecting a magnified image of the tool and lens.
13. In an apparatus for removing the material on the edge of a contact lens which lens is constructed in a particular manner having a concave and convex surface with the proper optical prescription and which is manufactured from a substance such as plastic and the like,
    (a) a base support means,
    (b) a lens retaining means on said base,
    (c) means on said base for driving said retained lens in an aligned rotational path with the edge of the lens substantially in a constant plane,
    (d) a cutting tool mounted on said base normally spaced from said lens and being movable into engagement with the edge of the lens,
    (e) a control means for said cutting tool including means that is manually movable along said base.
14. The device in claim 13 including guide means on said base by which said control member is manually moved for controlling the movement of the cutting tool into the edge of the contact lens.
15. The device in claim 14 including means for adjusting said guide means employed on said base whereby different movements may be employed representing the desired characteristics of the edge to be placed on the lens.
16. The device claimed in claim 15, wherein there is a screen and a projection and magnification means on said base support which projects an image of the lens and cutting tool on the screen.
17. The device in claim 16 including a light condenser means.
18. The device in claim 17 wherein said projection means includes a mirror system for directing an image produced by said condensed light through said condenser.
19. In an apparatus for removing the material to form the edge of a contact lens which lens is constructed in a particular manner having a concave and convex surface with the proper optical prescription and which is manufactured from a substance such as plastic and the like,
    (a) a base,
    (b) a lens retaining means on said base maintaining said lens in axial alignment,
    (c) a cutting tool on said base,
    (d) means on said base for moving said retained lens and said cutting tool relative to each other with the edge of the lens substantially in a constant plane,
    (e) a control means for said cutting tool including a means that is manually movable on said base,

(f) a guide template on said base for controlling the movement of the cutting tool into the edge of the contact lens,
(g) a screen on which an image of the lens and cutting tool is projected,
(h) and condensed light means on said base for projecting image of the tool and lens,
(i) lens means for said condensed light,
(j) and reflective means for directing said light and the image of the tool and lens produced thereby onto the screen.

References Cited by the Examiner
UNITED STATES PATENTS

| | | | |
|---|---|---|---|
| 1,580,426 | 4/1926 | Farnam | 29—200 |
| 2,306,461 | 12/1942 | Miller | 29—200 |
| 3,030,859 | 4/1962 | Elliott. | |
| 3,160,039 | 12/1964 | Rocher et al. | 82—13 |
| 3,194,092 | 7/1965 | Piotrowski | 82—14 |
| 3,212,370 | 10/1965 | Spriggs et al. | 82—14 |

FOREIGN PATENTS 836,236   1/1939   France.

WILLIAM W. DYER, Jr., *Primary Examiner.*

G. A. DOST, *Examiner.*